United States Patent [19]

Shine et al.

[11] Patent Number: 5,412,027
[45] Date of Patent: May 2, 1995

[54] PREPARATION OF HOMOGENEOUS POLYMERS USING SUPERCRITICAL FLUID SOLUTIONS

[75] Inventors: Annetta D. Shine, Newark, Del.; Steven D. Smith; Isao Noda, both of Fairfield, Ohio

[73] Assignees: The Procter & Gamble Company, Cincinnati, Ohio; The Univ. of Deleware, Newark, Del.

[21] Appl. No.: 155,041

[22] Filed: Nov. 19, 1993

Related U.S. Application Data

[63] Continuation of Ser. No. 675,764, Mar. 27, 1991, abandoned.

[51] Int. Cl.$^6$ .................. C08G 63/48; C08L 51/08
[52] U.S. Cl. .......................................... 525/63; 525/64; 525/69; 525/70; 525/72; 525/77; 525/78; 525/79; 525/80; 525/86; 525/87; 525/88; 525/89; 525/92 B; 525/93; 525/94; 525/95; 525/96; 525/98; 525/99
[58] Field of Search ................ 525/89, 92, 93, 94, 525/63, 64, 69, 70, 72, 77, 78, 79, 80, 86, 87, 88, 95, 96, 98, 99

[56] References Cited

U.S. PATENT DOCUMENTS

| | | | |
|---|---|---|---|
| 3,812,224 | 5/1974 | Smith et al. | 264/45 |
| 4,582,731 | 4/1986 | Smith | 427/421 |
| 4,594,371 | 6/1986 | Nauman | 523/340 |
| 4,666,961 | 5/1987 | Nauman | 523/340 |
| 4,703,105 | 10/1987 | Allada | 528/490 |
| 4,734,451 | 3/1988 | Smith | 524/546 |
| 5,106,906 | 4/1992 | Meier et al. | 525/51 |

OTHER PUBLICATIONS

A. K. Lele, A. D. Shine, "Dissolution and Precipitation of Polymers Using a Supercritical Solvent", Polymer Preprints, vol. 31, No. 1, p. 677, Apr. 1990.
B. D. Favis and L. A. Utracki, "Polyblends—'87 Preamble", Polym. Eng. Sci. 27, 1573 (1987).
D. Braun, P. R. Kohl and G. P. Hellmann, "The Glass Transition Temperatures of Homogeneous Blends of Polystyrene, Poly(methyl methacrylate), and Copolymers of Styrene and Methyl Methacrylate", Makromol. Chem. 189, 1671 (1988).
H. H. Chuah, T. Kyu and T. E. Helminiak, "The Kinetics of Phase Separation of PBT/Nylon 66 Molecular Composite", Polym. Mater. Sci. Eng. 56, 68 (1987).
E. B. Nauman, M. V. Ariyapadi, N. P. Balsara, T. A. Grocela, J. S. Furno, S. H. Liu and R. Mallikarjun, "Compositional Quenching: A Process for Forming Polymer-in-Polymer Microdispersions and Cocontinuous Networks", Chem. Eng. Comm. 66, 29 (1988).
A. R. Schultz and A. L. Young, "DSC on Freeze--Dried Poly(methyl methacrylate)-Polystyrene Blends", Macromolecules 13, 663 (1980).
D. W. Matson, R. C. Petersen, R. D. Smith, "Production of Powders and Films by the Rapid Expansion of Supercritical Solutions", J. Mat. Sci. 22, 1919 (1987).
L. H. Bangert, J. L. Lundberg, J. D. Muzzy, G. H. Hoyes, L. H. Olson, W. D. Freeston, "Advanced Technology Applications in Garment Processing", NSF Report RA-770428, NTIS PB 284, 779 (1977).
V. Krukonis, "Supercritical Fluid Nucleation of Difficult to Comminute Solids", presented at the AIChE Annual Meeting, San Francisco, Nov. (1984).
R. C. Peterson, D. W. Matson, R. D. Smith, "Rapid (List continued on next page.)

*Primary Examiner*—John Kight, III
*Assistant Examiner*—John M. Cooney, Jr.
*Attorney, Agent, or Firm*—Brahm J. Corstanje; Jerry J. Yetter; David L. Suter

[57] ABSTRACT

Homogeneous polymer blends are prepared from otherwise thermodynamically immiscible polymers, especially including block copolymers. Thus, polymers such as polystyrene/poly(methyl methacrylate) block copolymer or polystyrene/poly(1,2-butadiene) block copolymer are dissolved under pressure in supercritical fluid solvents such as chlorodifluoromethane and n-butane, respectively, and expanded through a fine nozzle. As the SCF solvent evaporates, the polymer deposits as a substantially homogeneous material.

8 Claims, 2 Drawing Sheets

OTHER PUBLICATIONS

Precipitation of Low Vapor Pressure Solids from Supercritical Fluid Solutions: The Formation of Thin Films and Powders", J. Am. Chem. Soc. 108, 2100 (1986).

D. W. Matson, R. C. Peterson, R. D. Smith, "The Precipitation of Polycarbosilane Powders and Fibers During Rapid Expansion of Supercritical Fluid Solutions", Mater. Lett. 4 (10), 429 (1986).

R. G. Hill, P. E. Tomlins, J. S. Higgins, "A Preliminary Study of the Dynamics of Phase Separation in Oligomeric Polystyrene–Polybutadiene Blends", Polymer 26, 1708 (1986).

C. C. Han, M. Okada, Y. Muroga, B. J. Bauer, Q. Tran–Cong, "Phase Decomposition Phenomena in Polystryrene/Poly(vinyl methyl ether)", Polym. Eng. Sci. 26, 1208 (1986).

T. Hashimoto, "Structure Formation in Polymer Mixtures by Spinodal Decomposition", in Current Topics in Polymer Science, vol. II, R. M. Ottenbrite, L. A. Ultracki and S. Inoue, eds., Hanser, New York, 199 (1987).

U. Delaware, Dept. of Chem. Eng. Research Report 1989, Apr. 3, 1990, p. 35.

PREPARATION OF HOMOGENEOUS POLYMERS USING SUPERCRITICAL FLUID SOLUTIONS

This is a continuation of application Ser. No. 07/675,764, filed on Mar. 27, 1991, which is now abandoned.

TECHNICAL FIELD

The present invention relates to the field of polymers, and encompasses new homogeneous polymers and methods for preparing such polymers from thermodynamically nonhomogeneous or otherwise immiscible polymers, especially block or graft copolymers.

BACKGROUND OF THE INVENTION

Polymer blends represent an important class of polymeric materials, accounting for 20% of the U.S. synthetic resin market in 1985. Although the majority of commercially important polymer blends are thermodynamically immiscible heterogeneous blends, considerable interest exists for producing miscible homogeneous blends, because such blends achieve properties intermediate to those of their constituent polymers. Commercial miscible blends are at present mainly used for their mechanical and thermal properties, but immense potential exists for the development of polymer blends with specially tailored optical, surface, barrier or biodegradation properties. In spite of much synthetic research effort, miscible polymer pairs are rare, because the high molecular weight of polymers provides little entropic driving force for miscibility. Favorable enthalpic contributions, which lead to miscibility, are possible only when specific interactions are present between moieties in the different polymers.

In an attempt to bypass the specific interactions requirement, researchers have studied potential techniques for producing nonequilibrium single-phase blends of thermodynamically immiscible polymers. These techniques typically involve the preparation of a dilute ternary solution of two polymers in a common liquid solvent, followed by rapid quenching of the blend into the solid state via coagulation, solvent evaporation or freeze-drying. These diffusion-governed processes are slow, as compared with incipient polymer phase separation in liquid solutions, so it is not surprising that some degree of phase separation occurs, e.g., micron-sized domains are formed or extremely broad glass transition temperatures are noted.

In light of the fact that many polymers (e.g., all glassy polymers) enjoy commercial use in a thermodynamic state far removed from equilibrium, it is short-sighted to limit the search for intermediate-property polymer blends to systems that are thermodynamically miscible. For example, rapid coagulation or quenching of polymer mixtures can result in a frozen-in single phase morphology, such as that observed in molecular composites. However, coagulation and quenching techniques are governed by solvent and heat diffusion, respectively, which are typically slow processes in high molecular weight systems, and can cause an undesirable skin/core morphology.

To summarize, various attempts by others to produce a homogeneous mixture of immiscible polymers or copolymers have involved processes such as solvent evaporation, coagulation, rapid freezing or freeze-drying. Each of these techniques is governed by a diffusive process, either of heat or of mass. Particularly in polymer-containing materials, diffusive processes are typically slow. The present invention produces a homogeneous mixture of immiscible polymers by density reduction of a solution whose solvent is above its critical point. The time scale of this process is governed by convection (i.e., bulk flow), not diffusion, and the characteristic convective velocity for flow of a compressible fluid such as a supercritical fluid is the speed of sound, which is quite rapid.

In addition to the foregoing, efforts have also been made to tailor polymer properties by bonding two or more dissimilar types of polymers in single, albeit high molecular weight, molecular species. Such polymers are of the general "block" or "graft" type material. Such polymers are quite different from random copolymers which can be prepared, for example, by the random copolymerization of two or more dissimilar polymerizable monomers. Rather, block or graft copolymers comprise large molecular units which individually comprise different polymerized species (referred to as "blocks") which are assembled into the final polymer structure by covalently bonding the blocks. Interestingly, however, the block or graft copolymers thus made can be in a nonhomogeneous molecular state at equilibrium. Stated differently, the blocks in the block or graft copolymer might be said to act almost independently of each other, as regards their phase and co-solubility behaviors. Considered thus, it seems reasonable that such polymers can exhibit inhomogeneity at equilibrium when their individual block units are, themselves, otherwise thermodynamically immiscible.

Producing homogeneous block or graft polymers is of practical interest for several reasons. The vast majority of pairs of polymers, or polymer blocks, are immiscible, and can form different phases at equilibrium. Pairs of polymers tend to macrophase separate or segregate; that is, they form separate domains of each component polymer, where the domains can be of the order of millimeters in size. Block (and graft) copolymers microphase separate; that is, they usually exhibit a microdomain morphology in the solid state, where the microdomain size is of the order of the block size. Because of phase separation, immiscible polymer blends are opaque and have poor mechanical properties, even to the point of having little mechanical integrity. In homogeneous miscible blends, however, transparency and good mechanical properties can be achieved. The properties are usually intermediate to the two components, so producing homogeneous mixtures of polymers offers the opportunity to achieve adjustable properties without the need for synthesizing new polymer materials. With nonhomogeneous block or graft copolymers the inhomogeneity results in properties of the original block constituents, plus unique properties which result from their connection.

Besides the usefulness of producing stable homogeneous polymer mixtures for the sake of their properties, it may be desirable to produce unstable homogeneous polymer mixtures that will revert in time to their thermodynamically stable, immiscible form. Since the rate of phase separation will be dependent on the environmental conditions, these materials could be used as environmental indicators, or as environmentally degradable materials. For block or graft copolymers, reversion to the thermodynamically stable and immiscible form results in the unique mechanical properties of the immiscible form.

According to the present invention, otherwise immiscible polymers such as block or graft copolymers are "homogenized" via a precipitation technique which is not limited by slow diffusion processes. The solid polymer is precipitated by rapid pressure (density) reduction from a homogeneous polymer solution in a supercritical fluid (SCF) solvent. Homogeneous polymers and polymer blends are produced thereby.

BACKGROUND ART

U.S. Pat. Nos. 4,594,371, Jun. 10, 1986, and 4,666,961, May 19, 1987, to E. B. Nauman, are concerned with a technique that produces a polymer mixture by rapid pressure reduction from a solution. The inventor uses elevated (albeit, rather low by the standards of the present invention) pressure in order to suppress solvent boiling when he raises the solution temperature in order to promote solvent evaporation in his low pressure chamber. However, these patents, and other journal publications which cover that process, are mainly concerned with: producing a two-phase mixture, rather than one-phase as in the present invention; a conventional incompressible liquid solvent, rather than a compressible supercritical fluid as in the present invention; solvent evaporation as the mechanism for producing the mixture, rather than density reduction as in the present invention; and a two-step process, since after the first evaporation step 30% to 60% of the remaining solution is solvent. The present invention is a one-step process that has essentially no solvent remaining after the one step.

U.S. Pat. Nos. 4,734,451, Mar. 29, 1988, and 4,582,731, Apr. 15, 1986, to Richard D. Smith, deal with the rapid expansion of supercritical fluid solutions to form thin films and fine powders of all sorts of materials. Smith makes no mention of using the technique to produce a homogeneous polymer mixture. Smith does state in the '731 patent that, "An additional object is to enable the deposition of nonequilibrium materials." The polymer mixtures produced in the present invention would be "nonequilibrium materials", as are innumerable other common materials.

A. K. Lele and A.D. Shine have published an article entitled "Dissolution and Precipitation of Polymers Using A Supercritical Solvent" in *Polymer Preprints*, Vol. 31, No. 1, page 677, April, 1990.

In addition to the foregoing, the following references relate to polymers, polymer blends, and various processes for their manufacture: B. D. Favis and L. A. Utracki, "Polyblends—'87 Preamble", Polym. Eng. Sci. 27, 1573 (1987); D. Braun, P. R. Kohl and G. P. Hellmann, "The Glass Transition Temperatures of Homogeneous Blends of Polystyrene, Poly(methyl methacrylate), and Copolymers of Styrene and Methyl Methacrylate", Makromol. Chem. 189, 1671 (1988); H. H. Chuah, T. Kyu and T. E. Helminiak, "The Kinetics of Phase Separation of PBT/Nylon 66 Molecular Composite", Polym. Mater. Sci. Eng. 56, 68 (1987). (See also references therein); E. B. Nauman, M. V. Ariyapadi, N. P. Balsara, T. A. Grocela, J. S. Furno, S. H. Liu and R. Mallikarjun, "Compositional Quenching: A Process for Forming Polymer-in-Polymer Microdispersions and Cocontinuous Networks", Chem. Eng. Comm. 66, 29 (1988. (See also references therein); A. R. Schultz and A. L. Young, "DSC on Freeze-Dried Poly(methyl methacrylate)—Polystyrene Blends", Macromolecules 13, 663 (1980); D. W. Matson, R. C. Petersen and R. D. Smith, "Production of Powders and Films by the Rapid Expansion of Supercritical Solutions", J. Mat. Sci. 22, 1919 (1987); L. H. Bangert, J. L. Lundberg, J. D. Muzzy, G. H. Hoyes, L. H. Olson and W. D. Freeston, "Advanced Technology Applications in Garment Processing", NSF Report RA-770428, NTIS PB 284, 779 (1977); V. Krukonis, "Supercritical Fluid Nucleation of Difficult to Comminute Solids", presented at the AIChE Annual Meeting, San Francisco, November (1984); R. C. Petersen, D. W. Matson and R. D. Smith, "Rapid Precipitation of Low Vapor Pressure Solids from Supercritical Fluid Solutions: The Formation of Thin Films and Powders", J. Am. Chem. Soc. 108, 2100 (1986); D. W. Matson, R. C. Petersen and R. D. Smith, "The Preparation of Polycarbosilane Powders and Fibers During Rapid Expansion of Supercritical Fluid Solutions", Mater. Lett. 4 (10), 429 (1986); R. G. Hill, P. E. Tomlins and J. S. Higgins, "A Preliminary Study of the Dynamics of Phase Separation in Oligomeric Polystyrene-Polybutadiene Blends", Polymer 26, 1708 (1985); C. C. Han, M. Okada, Y. Muroga, B. J. Bauer and Q. Tran-Cong, "Phase Decomposition Phenomena in Polystyrene/Poly(vinyl methyl ether)", Polym. Eng. Sci. 26, 1208 (1986); T. Hashimoto, "Structure Formation in Polymer Mixtures by Spinodal Decomposition", in *Current Topics in Polymer Science, Volume II*, R. M. Ottenbrite, L. A. Utracki and S. Inoue, eds., Hanser, New York, 199 (1987); and University of Delaware, Department of Chemical Engineering Research Report 1989, published Apr. 3, 1990 at p. 35, which contains a description of Annette D. Shine's research interests in polymer blends.

SUMMARY OF THE INVENTION

The present invention relates to a process for preparing a homogeneous blend of otherwise thermodynamically immiscible polymers, including at least one block or graft copolymer, comprising:
  a) preparing a solution of said polymers in a supercritical fluid solvent to form a single-phase solution blend;
  b) rapidly expanding the solution from step (a) across a small diameter nozzle; and
  c) removing said supercritical fluid solvent to precipitate the solid polymer blend at a final temperature which is no more than about 30° C. above the glass transition temperature of the polymer blend, and is preferably at or below the glass transition temperature, whereby the non-equilibrium homogeneous morphology of the blend is maintained.

It will be appreciated that mixtures of block or graft copolymers can be used in the aforesaid process.

In a preferred process, the solubility of the polymers in the supercritical fluid solvent is at least about 0.0001% by weight. In a highly preferred process, the concentration of the polymers in the supercritical fluid is less than about 5% by weight.

A variety of supercritical fluids can be used herein, including convenient materials such as members selected from the group consisting of chlorodifluoromethane, liquified $CO_2$, $N_2O$, and $C_2$-$C_4$ alkanes.

The polymers used herein can comprise:
  (a) one or more otherwise thermodynamically immiscible polymers selected from the group consisting of polyolefins; the polystyrenes; the polyamides; silicone polymers; polyesters; polyacrylates; polycyanoacrylates; polymethacrylates; polycyanomethacrylates; polycarbonates; poly(dienes); poly(oxides); vinyl polymers; polyurethanes;

polysulfones; cellulosic polymers; polyaminoacids; polyimides; and random copolymers thereof; and (b) one or more block or graft copolymers containing two or more of the aforesaid polymers as a constituent.

The process herein is typically carried out at a pressure from about 2000 psi to about 10,000 psi and at a temperature from about 30° C. to about 150° C.

The invention also encompasses a process for converting a nonhomogeneous equilibrium block or graft copolymer into a homogeneous nonequilibrium polymer, comprising:

a) preparing a solution of said polymer in a supercritical fluid solvent to form a single-phase solution;

b) rapidly expanding the solution from step (a) across a small diameter nozzle; and c) removing said supercritical fluid solvent to precipitate the solid polymer at a final temperature which is no more than about 30° C. above the glass transition temperature of the polymer, and is preferably at or below the glass transition temperature, whereby, the non-equilibrium homogeneous morphology of the polymer is maintained.

As above, in this aspect of the invention the solubility of the polymer in the supercritical fluid solvent is at least about 0.0001% by weight; the concentration of the polymer in the supercritical fluid is preferably less than about 5% by weight; and the supercritical fluid solvent is preferably a member selected from the group consisting of chlorodifluoromethane, liquified $CO_2$, $N_2O$, and $C_2$-$C_4$ alkanes.

Accordingly, the invention also encompasses a process wherein the polymer comprises a block or graft copolymer comprising two polymer units (or "blocks") selected from the group consisting of polyolefins; the polystyrenes; the polyamides; silicone polymers; polyesters; polyacrylates; polycyanoacrylates; polymethacrylates; polycyanomethacrylates; polycarbonates; poly(dienes); poly(oxides); vinyl polymers; polyurethanes; polysulfones; cellulosic polymers; polyaminoacids; polyimides; and mixtures thereof. Such processes are also typically carried out at a pressure from about 2000 psi to about 10,000 psi and at a temperature from about 30° C. to about 150° C.

In a preferred process, the polymer comprises polystyrene/poly(methyl methacrylate) block copolymer or polystyrene/poly(1,2-butadiene) block copolymer, and the supercritical fluid solvent is chlorodifluoromethane in the former case and butane in the latter.

The invention also encompasses polymer blends and solid, nonequilibrium homogeneous polymers, prepared according to the aforesaid process.

The following considerations are essential to the practice of the invention.

1) The block or graft copolymer, or mixture of block or graft copolymers, or mixture of block or graft copolymer with a random copolymer or homopolymer, must have appreciable (>ca. 0.0001 wt %) solubility in a SCF solvent.

2) When dissolved in the SCF, the block or graft copolymer (or polymer mixture) must form a homogeneous solution. For most block copolymers, this requirement is satisfied if the copolymer concentration is below the critical micelle concentration.

3) After dissolution, the polymer/SCF solution is rapidly expanded across a small diameter nozzle. The minimum cross sectional area of the nozzle must be small enough to ensure that the flow is choked, i.e., that sonic conditions occur at the minimum area section. Typically, this condition is fulfilled when the diameter of the nozzle is less than one-half the diameter of the polymer/solvent feed tubing leading to the nozzle.

4) The final temperature of the precipitated block or graft copolymer or polymer blend, which is governed by the initial temperature and pressure of the SCF solution, as well as by the pressure maintained in the precipitation enclosure, must be no more than ca. 30° C. above the glass transition temperature of the block copolymer or polymer blend, and is preferably at or below the glass transition temperature, in order to freeze in the nonequilibrium homogeneous morphology.

All weights, percentages and ratios herein are by weight, unless otherwise specified.

DETAILED DESCRIPTION OF THE INVENTION

Figure 1:
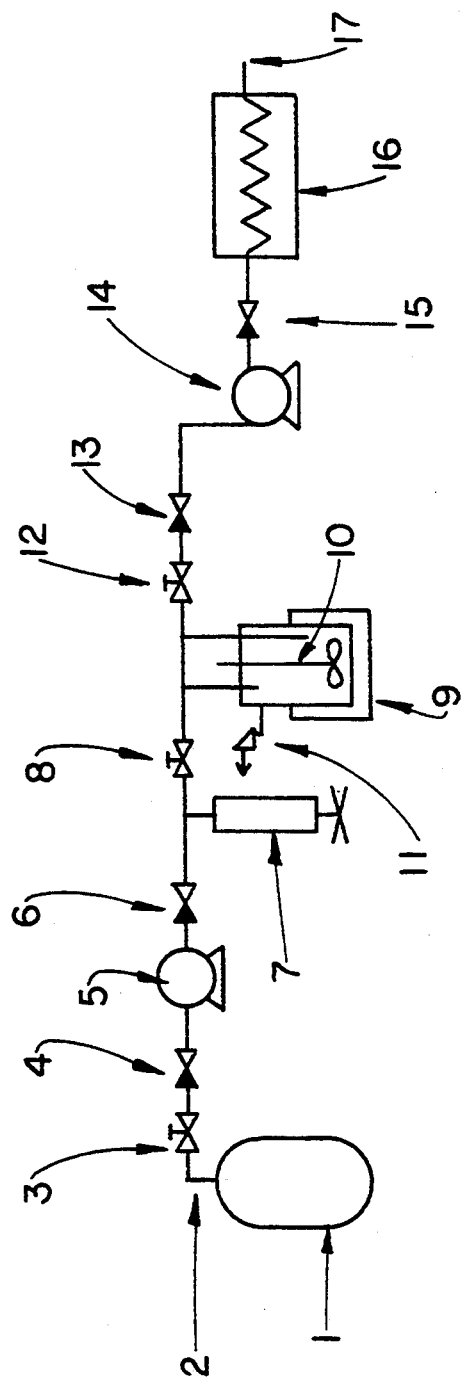
FIG. 1 is a schematic diagram of one type of equipment used for the polymer dissolution step of the present process. Solvent proceeds from the solvent reservoir (1) through feed line (2) through valve (3) and check valve (4) through pump (5) and check valve (6); thence via pressure intensifier means (7) and valve (8) into autoclave (9) containing the block copolymer or polymer mixture and fitted with stirring means (10) and rupture disk (11). After dissolution of the polymer, the solvent/polymer solution proceeds through valve (12) check valve (13) pump (14) and check valve (15) into heater (16). The solvent/polymer solution then proceeds through outlet tubing (17) into the apparatus depicted in FIG. 3.

The polymers and solvent materials employed herein can be conventional materials well-known in the art. The practice of this invention allows such polymers to be blended in such a way as to form homogeneous blends in a manner not heretofore achieved. However, the following is intended to assist the formulator in the selection of polymers and solvent materials for use herein. The items listed are by way of exemplification and not by way of limitation of polymers and solvent materials useful in the practice of this invention.

Polymers

The polymer materials used in the practice of this invention are selected from materials which exhibit appreciable solubilities (generally, a solubility of at least about 0.01%, by weight, under the chosen operating conditions is preferred) in various supercritical fluid (SCF) solvents. It will be appreciated, of course, that to achieve the polymer blends in the manner of the present invention, all polymers used must be co-soluble in the SCF solvent. Preferably, the co-solubility of all polymers chosen for a given polymer blend will be at least about 0.0001% by weight in the SCF in order to achieve reasonable through-put without need for a large excess of SCF. However, this is within the discretion of the formulator.

As mentioned hereinabove, block or graft copolymers of the type employed herein comprise large units (typically, with molecular weights on the order of several thousand to several hundred thousand), each unit being a substantially uniform molecular type, said units, or "blocks", being joined with other dissimilar blocks to form the overall block copolymer. (Such block or graft copolymers are quite distinct from random copolymers which are generally prepared by merely co-polymerizing mixtures of various polymerizable monomers in random fashion.) In the present process, the block or graft copolymers can be homogenized, singly, or can be homogenized with other block or graft copolymers, or can be mixed with random copolymers or homopolymers to form homogeneous mixtures. Preferred block copolymers herein include polystyrene/poly(1,2-butadiene) block copolymer and polystyrene/poly(methyl methacrylate) block copolymer.

Included among polymers useful herein are random- and homopolymers comprising: polyolefins, especially polyethylene and polypropylene; the polystyrenes; the polyamides, especially polyamides of the nylon-type; silicone polymers, especially the polydimethylsiloxanes; polyesters, especially the aliphatic polyesters; polyacrylates and polycyanoacrylates, polymethacrylates and polycyanomethacrylates; polycarbonates; poly(dienes); poly(oxides); vinyl polymers; polyurethanes; polysulfones; cellulosic polymers; polyaminoacids; polyimides, especially poly ether imides; as well as block copolymers containing these polymers as the block constituents. The molecular weights of the polymer species can vary, and generally range from about $10^4$ to about $2 \times 10^6$. It will be appreciated, moreover, that multiblend composites using three, or more, polymer types can also be prepared.

In addition, the physical properties of the polymer blends afforded by this invention can be further tailored by the selection of various weight ratios of the particular polymers chosen for use in the blends. Clearly, such matters can be left to the discretion and needs of the formulator. Polymer blends illustrated by the Examples hereinafter are typical.

Solvents

The materials useful as solvents herein are those which have now become widely recognized as "Supercritical Fluid" (SCF) solvents. In general, such materials are characterized by their enhanced solubilizing properties for solutes, including polymers, at high pressures. Nonlimiting examples of SCF's useful herein include a rather diverse array of chemical species, including, but not limited to: $CO_2$ (liquified); $N_2O$; chlorofluorocarbons; hydrochlorofluorocarbons, especially chlorodifluoromethane (DuPont; as Freon 22) and dichlorotrifluoroethane (DuPont HCFC 123 and 123a); low molecular weight alkanes, especially n-butane, propane and ethane; low molecular weight alkenes, especially ethylene; ammonia (liquified); alcohols such as methanol and ethanol; water; ethers such as diethyl ether; aromatic hydrocarbons such as toluene; pyridine; and the like. Mixtures of solvents may also be used. Standard references list additional SCF's. Convenient SCF solvents include chlorodifluoromethane, liquified $CO_2$, $N_2O$ and $C_2$–$C_4$ alkanes. In any event, the formulator has the option to select from a wide variety of individual SCF's or mixtures to achieve co-solubility of the selected polymers, as noted above.

Optional Ingredients

The homogeneous polymers described in this invention may also, optionally, be prepared with conventional polymer additives such as stabilizers, colorants, flame retardants, antioxidants, antistatic agents, antimicrobial agents or crosslinking agents. Such ingredients typically comprise from about 0.01% to about 2% by weight of the final polymers.

Processing Conditions

The process herein is typically carried out at pressures from about 2,000 psi to about 10,000 psi. Temperature ranges are typically 30° C.–150° C. It will be appreciated that these pressures and temperatures can be varied according to the specific SCF chosen, the specific polymers chosen and the equipment available to the formulator. Total sol ids content (i.e., polymer content) in the SCF is generally 5% (wt.) or less. The system can be operated in a continuous mode with liquid from rates ranging from 46 to 460 ml/hr.

Reference is made to the schematic diagrams (FIGS. 1 and 2) of the equipment used in the dissolution step of the present process. Depending on the solubility characteristics of the polymer or polymers used, the dissolution step is conducted in one of two different ways, shown in FIG. 1 and FIG. 2, respectively. For two or more polymers having vastly different equilibrium solubilities in the SCF solvent, or for polymers with high (>5%) individual solubility, the apparatus in FIG. 1 is preferred. Solvent from a solvent reservoir is fed through a pump (Milton Roy, Model 92015003) and pressure intensifier (HIP Model) to a heated autoclave (Fluitron 300 cc Model) containing the polymers to be dissolved. The autoclave is stirred until the polymer dissolves completely; the autoclave pressure typically ranges from atmospheric pressure to 10,000 psi. The polymer solution is pumped from the autoclave using a high pressure pump (Ruska), and may be heated by passing the solution through stainless steel tubing wrapped with a heating tape (Thermodyne Model BIH051020).

Figure 2:
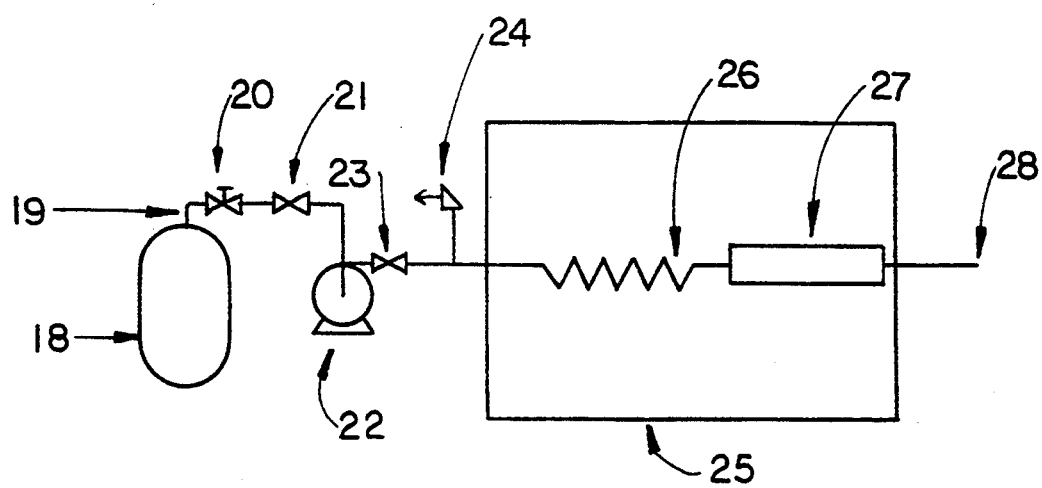
FIG. 2 is a schematic diagram of a second type of equipment used for the polymer dissolution step of the present process. Solvent proceeds from the solvent reservoir (18) through feed line (19) valve (20) check valve (21) pump (22) check valve (23) and into the oven assembly (25) which is fitted with rupture disk (24) pre-heater (26) and extraction column (27) containing the block copolymer or polymer mixture. The solvent/polymer solution proceeds through outlet tubing (28) into the apparatus depicted in FIG. (3).

For block or graft copolymers prepared from polymer units with similar equilibrium solubilities in the SCF solvent (e.g., for various block copolymers), use of the simpler apparatus shown in FIG. 2 is preferred for the dissolution step. In this process, the solvent is fed from solvent storage reservoir via minipump (Milton Roy, Model 92015003) and pressurized to a pressure typically in the range of about 1,400 to 6,000 psi. The pressurized solvent is passed through a 3 foot length of stainless steel tubing, which serves as a preheater, and then through a stainless steel extraction column which is packed with 3 mm glass beads and outfitted on the downstream end with a plug of glass wool acting as a filter. The polymers are coated onto the glass beads from the molten state or from solution before the beads are placed in the extraction column. Preheater and extraction column are enclosed in an oven (Precision Scientific, Model 28) which provides isothermal operating conditions up to 225° C. When the solvent stream contacts the polymers in the extraction column, the polymers dissolve in the solvent stream.

Figure 3:
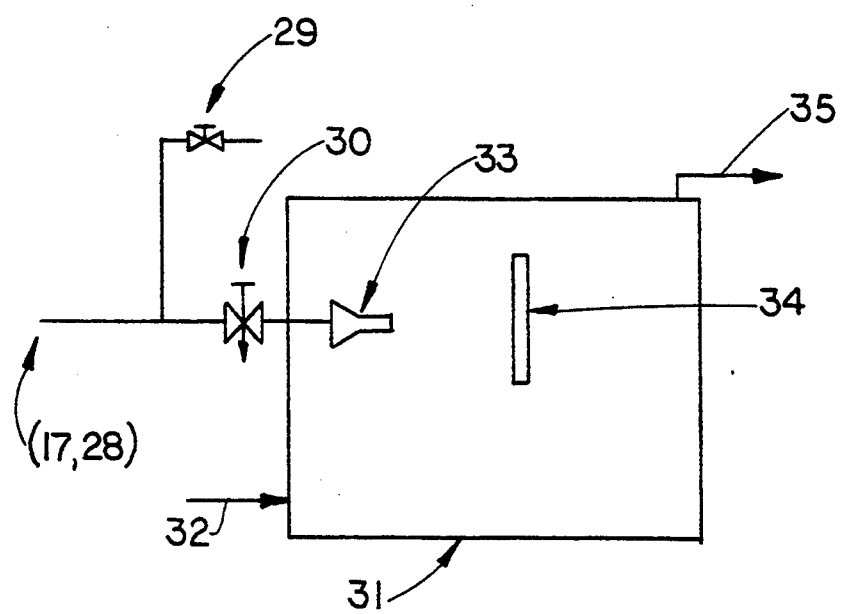
FIG. 3 is a schematic diagram of the polymer precipitation apparatus with polymer collecting means of the type conveniently used in the present process. Solvent/polymer solution proceeds from the equipment depicted in FIG. 1 or FIG. 2 via line (17, 28) through metering valve (30). The line is fitted with venting valve (29). The solution proceeds into enclosure (31) fitted with inert purge gas inlet (32) and solvent recovery outlet (35). The solvent/polymer solution is sprayed through nozzle (33) to impinge on collection surface (34).

After the block or graft copolymer or polymer mixture has been dissolved in the SCF solvent, using either the apparatus shown in FIG. 1 or 2, the polymer solution is transferred to the precipitation apparatus shown in FIG. 3. The solution passes through a metering valve to an outlet nozzle consisting of a stainless steel disk (0.25 in. diameter, 0.01 in. thick) with a fine diameter hole (15 to 100 micrometers) through its center (Advanced Laser Systems, Waltham, Mass.). All pressurized tubing is 0.109 in. I.D. The outlet tubing leading to the nozzle is heated with a heating tape (not shown in the Figure; Thermodyne Model BIH05120) so that the cooling effect of the expansion process does not cause premature precipitation and plugging of the fine diameter nozzle. The precipitated sample is collected on the collecting surface—typically, glass slides or rotating cylinders can be used. The sample may also be collected on a filter or filter bag. The nozzle and collecting surface are contained in an enclosure that is typically maintained at atmospheric conditions, but may be kept under vacuum or elevated pressure. If flammable solvents are used in the process, it is preferred to keep a constant stream of an inert gas, such as nitrogen, flowing through the enclosure. After polymer precipitation, the solvent is recovered by condensation or compression, and may be reused in the dissolution step.

The following Examples further illustrate the practice of this invention, but are not intended to be limiting thereof.

EXAMPLE I

Using the dissolution apparatus described in FIG. 2 and the precipitation apparatus described in FIG. 3, a homogeneous polymer comprising a polystyrene/poly(methyl methacrylate) block copolymer (1:1 ratio of polystyrene block to poly[methyl methacrylate] block; each block of 15,000 molecular weight) is prepared in chlorodifluoromethane at a pressure above 2000 psi. Total solids concentration in the chlorodifluoromethane is below 1%, to ensure that a single phase mixture is formed. The temperature of the oven and the outlet tubing is ca. 110° C. Throttling the mixture through the 30 micrometer nozzle onto the collecting surface results in the formation of a homogeneous copolymer composition in the form of a fine powder.

EXAMPLE II

Following the procedure of Example I, a homogeneous mixture of a polystyrene/poly(1,2-butadiene) block copolymer (3:1 ratio of polystyrene to poly[1,2-butadiene] block; polystyrene block of 60,000 molecular weight; poly[1,2-butadiene] block of 20,000 molecular weight) is prepared from butane at 155° C.

EXAMPLE III

Following the procedure of Example I, a homogeneous mixture of a polystyrene/poly(methyl methacrylate) block copolymer (1:1 ratio of polystyrene block to poly[methyl methacrylate] block; each block of 15,000 molecular weight) with poly(methyl methacrylate) homopolymer is prepared. The block copolymer and the homopolymer are mixed in a 1:1 ratio.

EXAMPLE IV

Following the procedures hereinabove, a 1:2 (wt.) mixture of the polystyrene/poly(methylmethacrylate) block copolymer of Example I and the polystyrene/poly(1,2-butadiene) block copolymer of Example II is combined into a substantially homogeneous polymer blend.

It will be appreciated that the aforesaid disclosures regarding the processes and polymers made therefrom represent typical embodiments of the present invention, but that other embodiments fall within the ambit of the invention without departing from the scope thereof.

What is claimed is:

1. A process for preparing a homogeneous blend of otherwise thermodynamically immiscible polymers, including at least one block or graft copolymer, comprising rapidly expanding a heated single-phase solution of said polymers in a supercritical fluid solvent across a small diameter nozzle, whereby said supercritical fluid solvent is removed and the solid polymer blend is precipitated, at a temperature of no more than 30° C. above the glass transition temperature of the polymer blend, whereby the non-equilibrium homogeneous morphology of the blend is maintained.

2. A process according to claim 1 wherein the solubility of the polymers in the supercritical fluid solvent is at least about 0.0001% by weight.

3. A process according to claim 1 wherein the concentration of the polymers in the supercritical fluid is below the critical micelle concentration.

4. A process according to claim 1 wherein the supercritical fluid solvent is a member selected from the group consisting of chlorodifluoromethane, liquified $CO_2$, $N_2O$, and $C_2$–$C_4$ alkanes.

5. A process according to claim 1 wherein the polymer blend comprises:
   (a) one or more otherwise thermodynamically immiscible polymers selected from the group consisting of polyolefins; the polystyrenes; the polyamides; silicone polymers; polyesters; polyacrylates; polycyanoacrylates; polymethacrylates; polycyanomethacrylates; polycarbonates; poly(dienes); poly(oxides); vinyl polymers; polyurethanes; polysulfones; cellulosic polymers; polyaminoacids; polyimides; and random copolymers thereof; and
   (b) one or more block or graft copolymers containing two or more of the aforesaid polymers as a constituent.

6. A process according to claim 1 which is carried out at a pressure from about 2000 psi to about 10,000 psi and at a temperature from about 30° C. to about 150° C.

7. A homogeneous blend of polymers prepared according to claim 1.

8. The process of claim 2, wherein the solubility of the polymers in the supercritical fluid solvent is from about 0.0001% to about 5%.

* * * * *